(12) United States Patent  
Matsumoto

(10) Patent No.: US 7,711,485 B2  
(45) Date of Patent: May 4, 2010

(54) MERGE SUPPORT SYSTEM

(75) Inventor: Yuji Matsumoto, Chiryu (JP)

(73) Assignee: DENSO CORPORATION, Kariya (JP)

( * ) Notice: Subject to any disclaimer, the term of this patent is extended or adjusted under 35 U.S.C. 154(b) by 659 days.

(21) Appl. No.: 11/520,595

(22) Filed: Sep. 14, 2006

(65) Prior Publication Data

US 2007/0067100 A1    Mar. 22, 2007

(30) Foreign Application Priority Data

Sep. 14, 2005  (JP)  ............................. 2005-267162  
Dec. 26, 2005  (JP)  ............................. 2005-373205  
Aug. 22, 2006  (JP)  ............................. 2006-225447

(51) Int. Cl.
- G06F 17/00  (2006.01)
- G01C 3/14  (2006.01)
- G05D 1/00  (2006.01)

(52) U.S. Cl. .................... 701/301; 701/96; 382/104; 382/171

(58) Field of Classification Search ............... 701/213, 701/301, 211, 208, 96; 340/903, 436, 435, 340/901; 382/104, 171, 106; 180/170  
See application file for complete search history.

(56) References Cited

U.S. PATENT DOCUMENTS

| | | | |
|---|---|---|---|
| 5,801,943 A * | 9/1998 | Nasburg | ...................... 701/117 |
| 6,098,005 A * | 8/2000 | Tsukamoto et al. | ........... 701/65 |
| 6,415,222 B1 * | 7/2002 | Sato et al. | .................... 701/208 |
| 6,466,867 B1 * | 10/2002 | Sakashita | ..................... 701/211 |
| 6,873,911 B2 * | 3/2005 | Nishira et al. | ................ 701/301 |
| 2007/0018801 A1 * | 1/2007 | Novotny et al. | ............... 340/435 |

FOREIGN PATENT DOCUMENTS

| | | |
|---|---|---|
| JP | A-H08-159790 | 6/1996 |
| JP | A-H10-105884 | 4/1998 |
| JP | A-H11-53685 | 2/1999 |
| JP | A-H11-86192 | 3/1999 |
| JP | A-H11-345396 | 12/1999 |
| JP | A-2001-134900 | 5/2001 |

* cited by examiner

*Primary Examiner*—Khoi H. Tran  
*Assistant Examiner*—Ronnie Mancho  
(74) *Attorney, Agent, or Firm*—Posz Law Group, PLC

(57) ABSTRACT

A merge support system includes a first detection unit and a second detection unit for detecting a position and a speed of an approaching vehicle in a traffic on a main lane and a position and a speed of a subject vehicle, an information provision unit for providing information for a driver of the subject vehicle and a control unit for calculating a merge speed of the subject vehicle relative to the traffic on the main lane and a merge position relative to the traffic on the main lane. The control unit calculates the merge speed and the merge position on the main lane based on the position and the speed of the approaching vehicle and the subject vehicle, and the control unit controls the information provision unit for providing a calculation result of the merge speed and the merge position for the driver of the subject vehicle.

5 Claims, 11 Drawing Sheets

MERGE SUPPORT SYSTEM

CROSS REFERENCE TO RELATED APPLICATION

This application is based on and claims the benefit of priority of Japanese Patent Applications No. 2005-267162 filed on Sep. 14, 2005, No. 2005-373205 filed on Dec. 26, 2005, and No. 2006-225447 filed on Aug. 22, 2006, the disclosure of which is incorporated herein by reference.

FIELD OF THE INVENTION

The present invention generally relates to a vehicular navigation system.

BACKGROUND OF THE INVENTION

In recent years, a specific type of navigation system is used to navigate a vehicle when the vehicle is merging from an onramp into a through traffic on a main lane of an expressway or the like. For example, Japanese patent document JP-A-H11-86192 discloses a technique that facilitates a smooth merging of a subject vehicle by reporting to a driver of the subject vehicle a position and appearance of an approaching vehicle in the through traffic on a main lane. In addition, the navigation system in the above disclosure provides for the driver of the subject vehicle a predicted position of the approaching vehicle at a certain period of time after an initial report of the position and appearance of the approaching vehicle.

However, the driver of the subject vehicle has to determine a merge speed by him/herself based on the information provided by the navigation system. That is, the driver has to decide the merge speed by him/herself based on the predicted position of the approaching vehicle provided by the navigation system. In addition, the driver has to find an appropriate merge timing and/or a merge position at the same time for merging. Therefore, the driver of the subject vehicle has to process a large amount of information for merging operation provided by the navigation system at his/her own cost. In other words, the navigation system leaves a huge load on the driver's disposal even when it provides navigation information for merging into the traffic on the main lane.

SUMMARY OF THE INVENTION

In view of the above-described and other problems, the present disclosure provides a merge support system that supports merge operation by a driver of a vehicle when the vehicle merges from a merge lane into a traffic on a main lane of an expressway.

In one aspect of the present disclosure, a navigation system in the merge support system includes a first detection unit for detecting a position and a speed of an approaching vehicle in a traffic on a main lane, a second detection unit for detecting a position and a speed of a subject vehicle, a information provision unit for providing information for a driver of the subject vehicle and a control unit for calculating a merge speed of the subject vehicle relative to the traffic on the main lane and a merge position relative to the traffic on the main lane. The control unit calculates the merge speed and the merge position on the main lane based on the position and the speed of the approaching vehicle and the subject vehicle, and the control unit controls the information provision unit for providing a calculation result of the merge speed and the merge position for the driver of the subject vehicle. In this manner, the navigation system supports the driver of the subject vehicle in deciding the merge speed and/or the merge position. In addition, the merge position is identified relative to the approaching vehicle in the traffic on the main lane in the information provided for the driver, thereby enabling the driver to have an easy recognition of the merge position in the traffic. As a result, a driver's load for merging is further decreased.

In another aspect of the present disclosure, the navigation system supports the driver of the subject vehicle in deciding merge speed control of the subject vehicle. That is, the driver of the subject vehicle is notified that he/she should either increase or decrease (i.e., accelerate or decelerate) the speed of the subject vehicle for merging. In this manner, the driver's load for merging is further decreased.

In yet another aspect of the present disclosure, the navigation system determines the merge position based on the information about driving skill of the driver who is currently controlling the subject vehicle. The identity of the driver is recognized by the navigation system based on an input from the driver. The driving skill of each driver is determined based on driving operation by the driver and vehicle travel information (e.g., average speed, speed control characteristics or the Ike) as well as driver's age, sex, the number of travel at a specific point in of the expressway or the like. In this manner, the navigation system can provide merge navigation suitable tailored for each driver, thereby reducing driver's stress caused by mismatch between the driver's characteristic and navigation instruction.

In still yet another aspect of the present disclosure, the merge support system determines the speed and the position of the approaching vehicle on the main lane based on information acquired from a roadside device at a proximity of a merge point, and provides the merge navigation for the driver of the subject vehicle. The information from the roadside device may be the speed and the position of the approaching vehicle, or may be the information that can be used to calculate the speed/position. In this manner, the merge support system can support the driver of the subject vehicle in deciding the merge operation. In addition, merge support information provided by the merge support system considers the driver's characteristic attributes such as the age, sex or the like and, the merge position is identified by using characteristic attributes of the approaching vehicle such as a vehicle type, a body color or the like for further facilitating a smooth merge operation.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
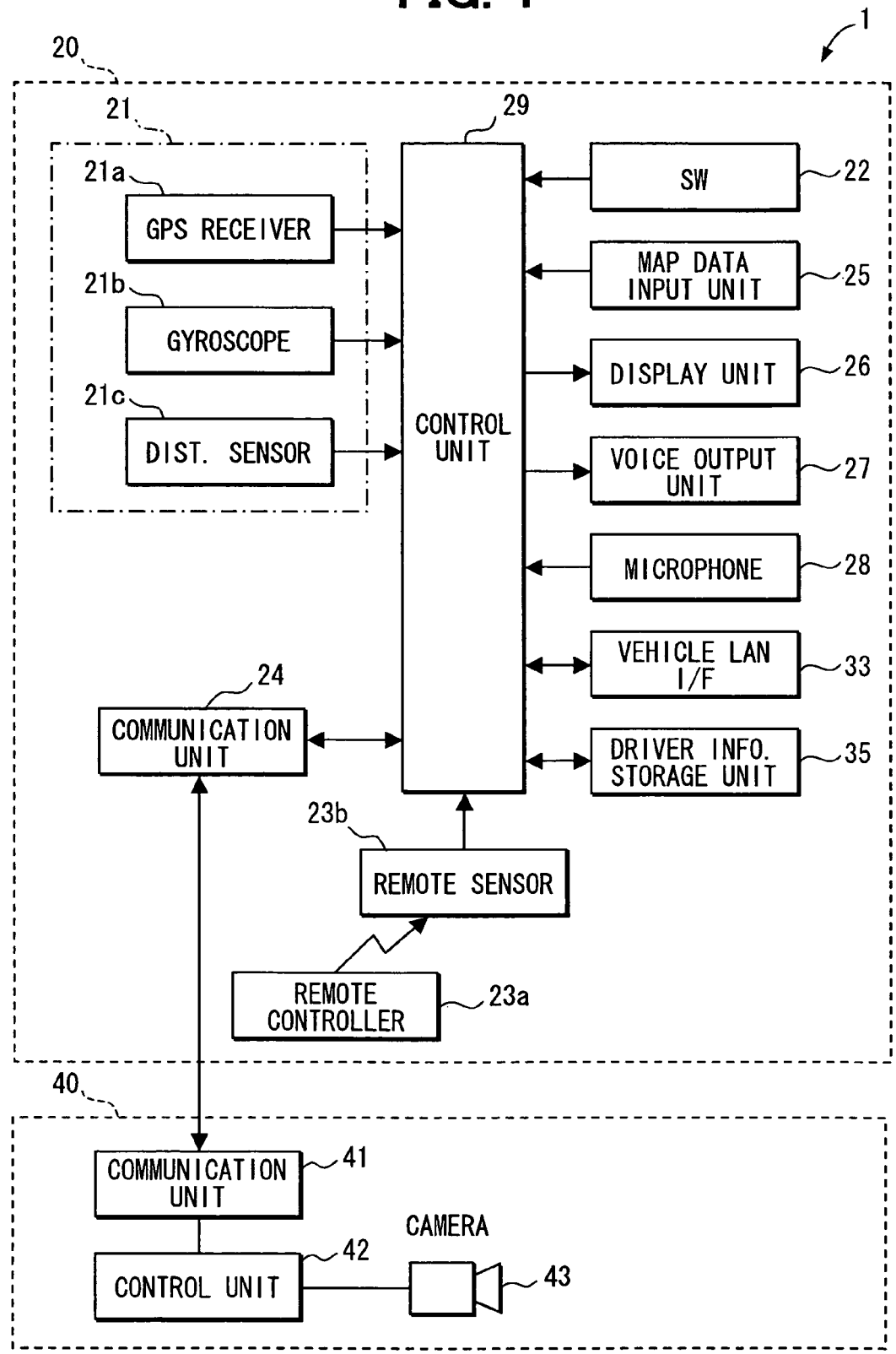
FIG. 1 shows a block diagram of a merge support system in an embodiment of the present disclosure.

The present invention will be described in detail with reference to various embodiments, in which the same reference numerals designate same or similar members. The present invention is described on a basis of a right side traffic, but may also be applied to a left side traffic by reversing the direction of the traffic.

An embodiment of a merge support system 1 in the present disclosure is described as a combination of a navigation system 20 and a roadside device 40.

FIG. 1 shows a block diagram of the merge support system including the navigation system 20 and the roadside device 40. The merge support system may include plural units of the navigation systems 20 and the roadside devices 40.

The navigation system 20 includes a function of the merge support system 1. The navigation system 20 is used in a vehicle, and includes a position detector 21 for detecting a current position, operation switches 22 for inputting user instructions, a remote controller 23a that has a separate body, a remote sensor 23b that receives a signal from the remote controller 23a, a communication unit 24 for having communication with the roadside device 40, a map data input unit 25 for inputting map data from map data medium, a display unit 26 for displaying map and various information, a voice output unit 27 for output a guidance voice, a microphone 28 for outputting users voice as an electric signal, a vehicle LAN interface 33 for having communication with ECUs and the like coupled with a vehicle LAN, a driver information storage unit 35 that stores driving skill of a driver, and a control unit 29 that conducts various processes for controlling the communication unit 24, the display unit 26, the voice output unit 27, the vehicle LAN interface 33, and the driver information storage unit 35 based on the input from the above described components including the position detector 21, operation switches 22, remote controller 23a, the remote sensor 23b, the communication unit 24, the map data input unit 25, the microphone 28, the vehicle LAN interface 33, and the driver information storage unit 35.

The position detector 21 includes a GPS (Global Positioning System) receiver 21a that receives a radio wave from a GPS satellite through an antenna (not shown in the figure), a gyroscope 21b that detects a rotation of a vehicle body, a distance sensor 21c that detects a travel distance of the vehicle based on acceleration or the like in a front-rear direction of the vehicle. The control unit 29 calculates a vehicle position, a vehicle direction, a vehicle speed and the like based on the input from the above described sensors in the position detector 21. The vehicle position based on an output signal from the GPS receiver 21a may use various methods such as point positioning, relative positioning or the like.

The operation switches 22 includes a touch panel that is disposed on, for example, the display unit 26, and mechanical switches or the like around the display unit 26. The touch panel is integrally formed on the display unit 26, and the touch panel may detect touch input by using any one of various methods such as a pressure sensing method, an electromagnetic induction method, an electrostatic induction method, or a combination of these methods.

The communication unit 24 communicates with the roadside device 40 for retrieving information from the roadside device 40.

The map data input unit 25 controls input of map data from map data storage medium such as a hard disk, a DVD-ROM or the like. The map data storage medium stores the map data including node data, link data, cost data, background data, road data, name data, mark data, intersection data, facility data and the like as well as guidance voice data and voice recognition data. The map data may be inputted through communication network instead of using the map data storage medium.

The display unit 26 uses a liquid crystal display, an organic EL display, or a CRT display for displaying map data and various information in color. A display screen of the display unit 26 displays, for example, a vehicle position mark at a current vehicle position detected by the position detector 21 on the map data inputted from the map data input unit 25, and a navigation route toward a destination of a travel as well as names of places, landmarks, facilities with guidance data and the like.

The voice output unit 27 outputs guidance voice and various information regarding the facility inputted from the map data input unit 25.

The microphone 28 outputs an electric signal (a voice signal) based on the user's voice. The user of the navigation system 20 controls the operation of the navigation system 20 by inputting various instructions from the microphone 28.

The vehicle LAN interface 33 is coupled with the vehicle LAN, and control communication with various ECUs, sensors and devices such as an engine ECU, a turn signal and the like.

The driver information storage unit 35 stores driver information such as age data, driving history such as years of driving experience, driving distance, the number of travel at each of merge points and the like, in addition to driving operation data (e.g., accelerator operation data, shift operation data, brake operation data and the like) and travel data (e.g., an average speed data, acceleration/deceleration data and the like) for each of the driver of a subject vehicle. The driver information may include personality data, sex of the driver and the like.

The control unit 29 is a well-known type computer that includes a CPU, a ROM, a RAM, an SRAM, an I/O and a bus line for connecting those components. The control unit 29 uses a program stored in the ROM and the RAM for controlling various processes. For example, a current vehicle position is calculated as a combination of coordinates and a travel direction based on a detection signal from the position detector 21, and processes such as current position display on the display unit 26 based on the map data inputted from the map data input unit 25 and rout navigation calculation and provision with the guidance voice and illustrative display based on the input of the destination inputted by operating the operation switches 22, the remote controller 23a and the like are conducted under control of the control unit 29.

The roadside device 40 includes a communication unit 41, a control unit 42 and a camera 43. The roadside device 40 is disposed at a merge point of a ramp in an expressway or the like.

The communication unit 41 controls communication of the roadside device 40. The control unit 42 is a well-known type computer that includes a CPU, a ROM, a RAM, an SRAM, an I/O and a bus line for connecting those components. The control unit 42 uses a program stored in the ROM and the RAM for controlling various processes. For example, a transmission process of an image captured by the camera 43 to the navigation system 20 through the communication unit 41 is controlled by the control unit 29.

The camera 43 on a roadside is trained toward upstream of the traffic to capture an approaching traffic of the vehicle on the main lane of the expressway or the like, and captures the approaching traffic in a range of several hundred meters.

Figure 2:
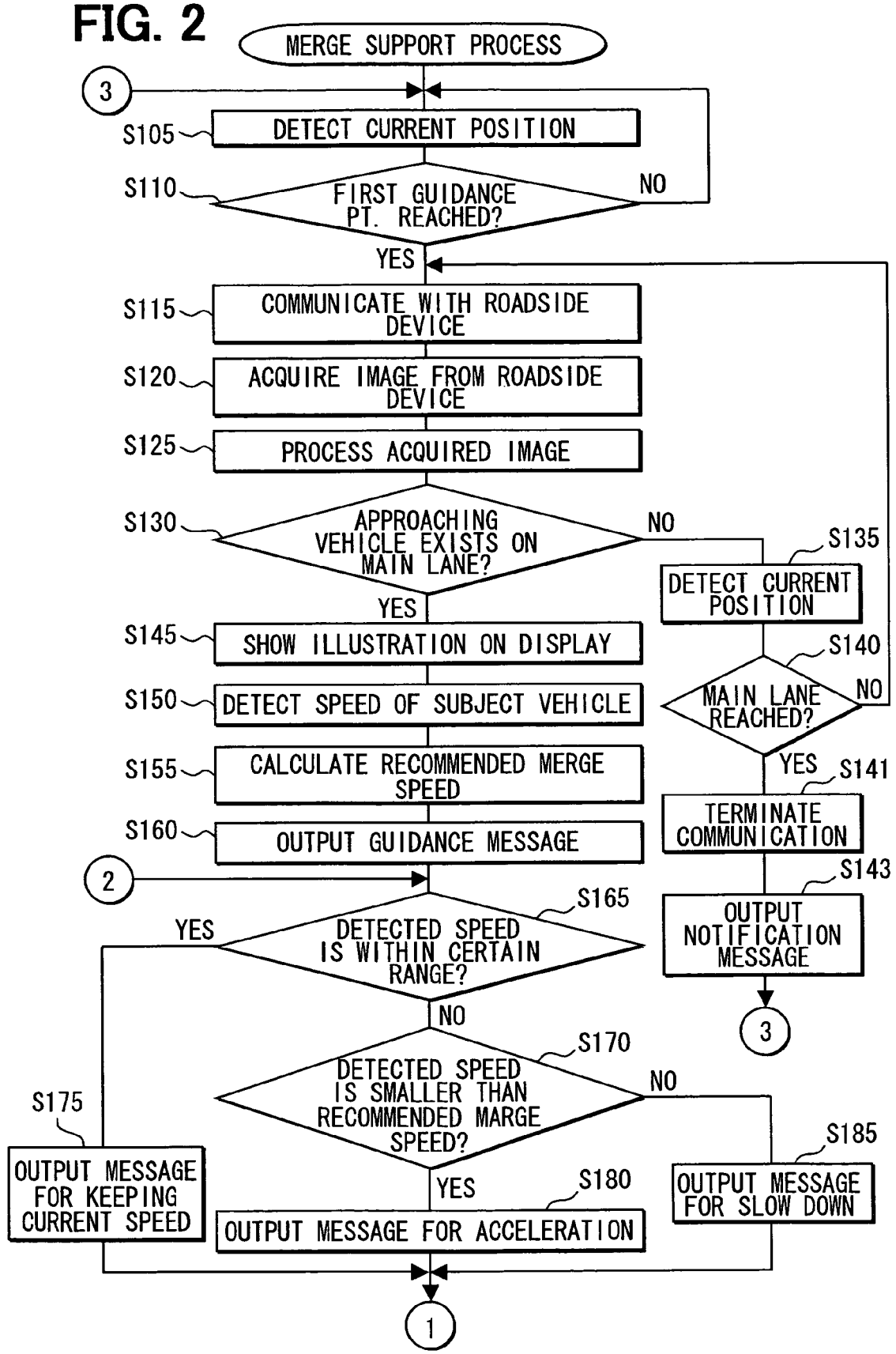
FIGS. 2 and 3 show a flowchart of a merge support process conducted in a navigation system in the present embodiment.

Operation scheme of the merge support system 1 is described with reference to a flowchart in FIGS. 2 and 3. A merge support process conducted by the control unit 29 of the navigation system 20 begins when an electric power is supplied for the navigation system 20. Description of the other processes conducted by the control unit 29 is omitted because they are well-known type processes.

In step S105, the process detects a current position of the subject vehicle based on a signal from the position detector 21.

Figure 4:
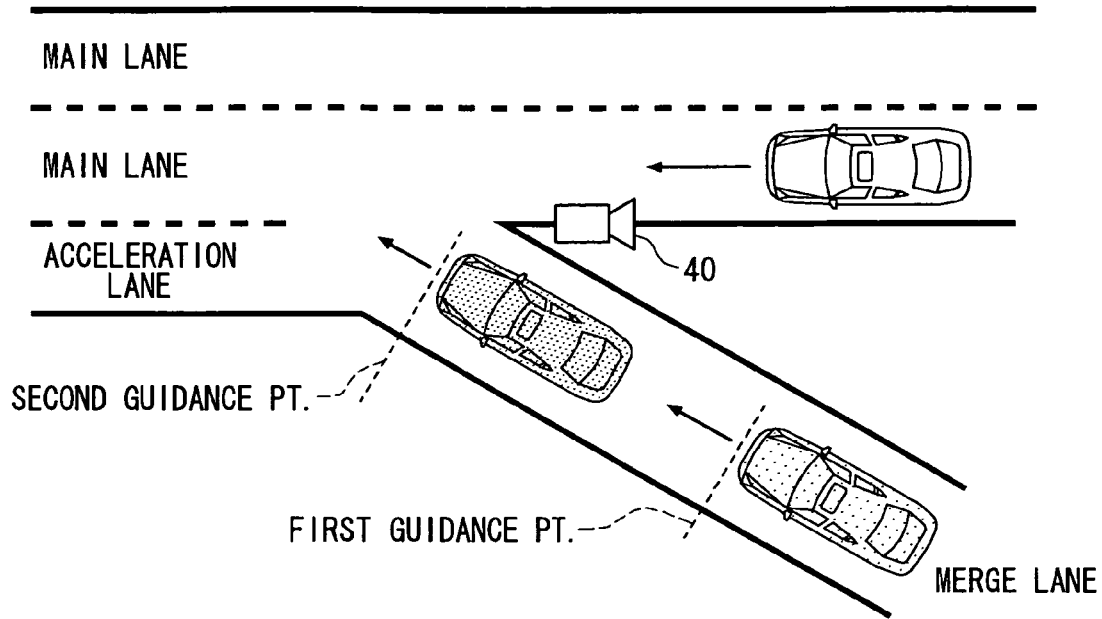
FIG. 4 shows an illustration of a first and a second guidance points.

In step S110, the process determines whether the subject vehicle reaches a first guidance point based on the current position of the subject vehicle and map data inputted from the map data input unit 25. The process proceeds to step S115 when the subject vehicle has reached the first guidance point (step S115: YES). The process returns to step S105 when the subject vehicle has not reached the first guidance point (step S115: NO). The first guidance point is illustrated in FIG. 4. FIG. 4 shows a top view of a merge point of a merge lane and to a main lane. As shown in FIG. 4, the first guidance point is on the merge lane that merges with the main lane. The first guidance point is a position that allows the driver of the subject vehicle to have sufficient time for recognizing a recommended merge speed and for accelerating the subject vehicle to the recommended merge speed upon provision of the recommended merge speed from the navigation system 20. Further, a second guidance point is a start point of an acceleration lane. These points are defined appropriately according to a condition of each of the merge lanes.

In step S115, the process communicates with the roadside device 40 through the communication unit 24.

In step S120, the process acquires an image of the main lane from the roadside device 40.

In step S125, the process conducts a recognition process that analyzes the image for determining whether an approaching vehicle is captured in the image. The recognition process is also used for determining a speed and a position of the approaching vehicle based on plural images taken at respectively different timings.

In step S130, the process determines whether there is the approaching vehicle in the image. The process proceeds to step S145 when the approaching vehicle is detected in the image (step S130: YES). The process proceeds to step S135 when the approaching vehicle is not detected in the image (step S130: NO).

In step S135, the process detects the current position of the subject vehicle.

In step S140, the process determines whether the subject vehicle has reached the main lane. The process proceeds to step S141 when the subject vehicle is determined to have reached the main lane (step S140: YES). The process returns to step S115 when the subject vehicle is not determined to have reached the main lane (step S140: NO).

In step S141, the process terminates the communication with the roadside device 40.

In step S143, the process notifies the driver that the subject vehicle has merged into traffic on the main lane. For example, the guidance voice such as "Merge operation completed. Have a nice day!" or the like is provided for the driver from the voice output unit 27 together with a message displayed on the display unit 26.

Figure 5:
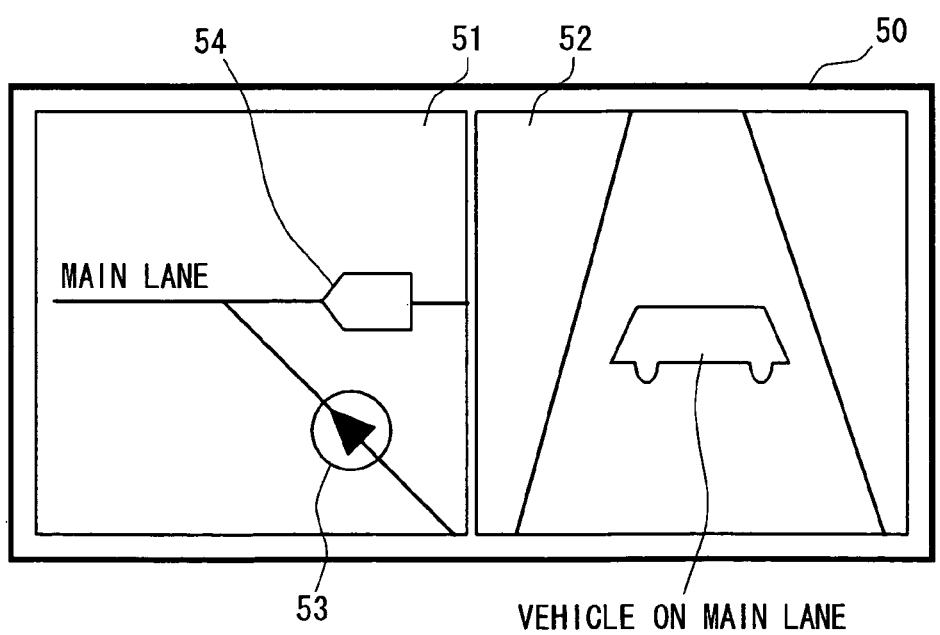
FIG. 5 shows an illustration of a merge point and an image of an approaching vehicle.

In step S145, the process displays an illustration of the approaching vehicle on the main lane with the image acquired in step S120 on the display unit 26. FIG. 5 shows an example of a screen 50 on the display unit 26. The screen 50 includes an illustration area 51 for showing the illustration of the approaching vehicle and an image area 52 for showing the acquired image. The illustration area 51 shows in the illustration a subject vehicle icon 53 that represents the subject vehicle and an approaching vehicle icon 54 that represents the approaching vehicle on the main lane. The image area 52 shows the acquired image of the approaching vehicle. The screen 50 is updated in a timely manner for reflect current conditions of the traffic and the subject vehicle.

In step S150, the process detects a speed of the subject vehicle. More practically, the process acquires a speed signal from a speed sensor through a vehicle LAN interface 33.

In step S155, the process calculates the recommended merge speed based on the speed and position of the approaching vehicle on the main lane analyzed in step S125 and the current position and the speed of the subject vehicle. The recommended merge speed may be, for example, the same speed as the approaching vehicle on the main lane.

In step S160, the process outputs the guidance voice that notifies the recommended merge speed for the driver. For example, the guidance voice from the voice output unit 27 may sound "Recommended speed is 65 km/h." with an accompanying message displayed on the display unit 26.

In step S165, the process determines whether the speed of the subject vehicle is within a certain range of the recommended merge speed. The certain range in this case means a speed of several km/h. The process proceeds to step S175 when the speed of the subject vehicle is currently within the certain range (step S165: YES). The process proceeds to step S170 when the speed of the subject vehicle is not currently within the certain range (step S165: NO).

In step S170, the process determines whether the speed of the subject vehicle is smaller than the recommended merge speed. The process proceeds to step S180 when the speed of the subject vehicle is smaller than the recommended merge speed (step S170: YES). The process proceeds to step S185 when the speed of the subject vehicle is not smaller than the recommended merge speed (step S170: NO).

In step S175, the process outputs the guidance voice that encourage the driver to maintain a current speed. For example, the guidance voice from the voice output unit 27 may sound "Maintain current speed." with an accompanying message displayed on the display unit 26.

In step S180, the process outputs the guidance voice that encourages the driver to accelerate to the recommended merge speed. For example, the guidance voice from the voice output unit 27 may sound "Accelerate to 65 km/h." or "Please step on accelerator." with an accompanying message displayed on the display unit 26.

In step S185, the process outputs the guidance voice that encourages the driver to decelerate to the recommended merge speed. For example, the guidance voice from the voice output unit 27 may sound "Slow down to 65 km/h." or "Please release the accelerator." with an accompanying message displayed on the display unit 26.

Figure 3:
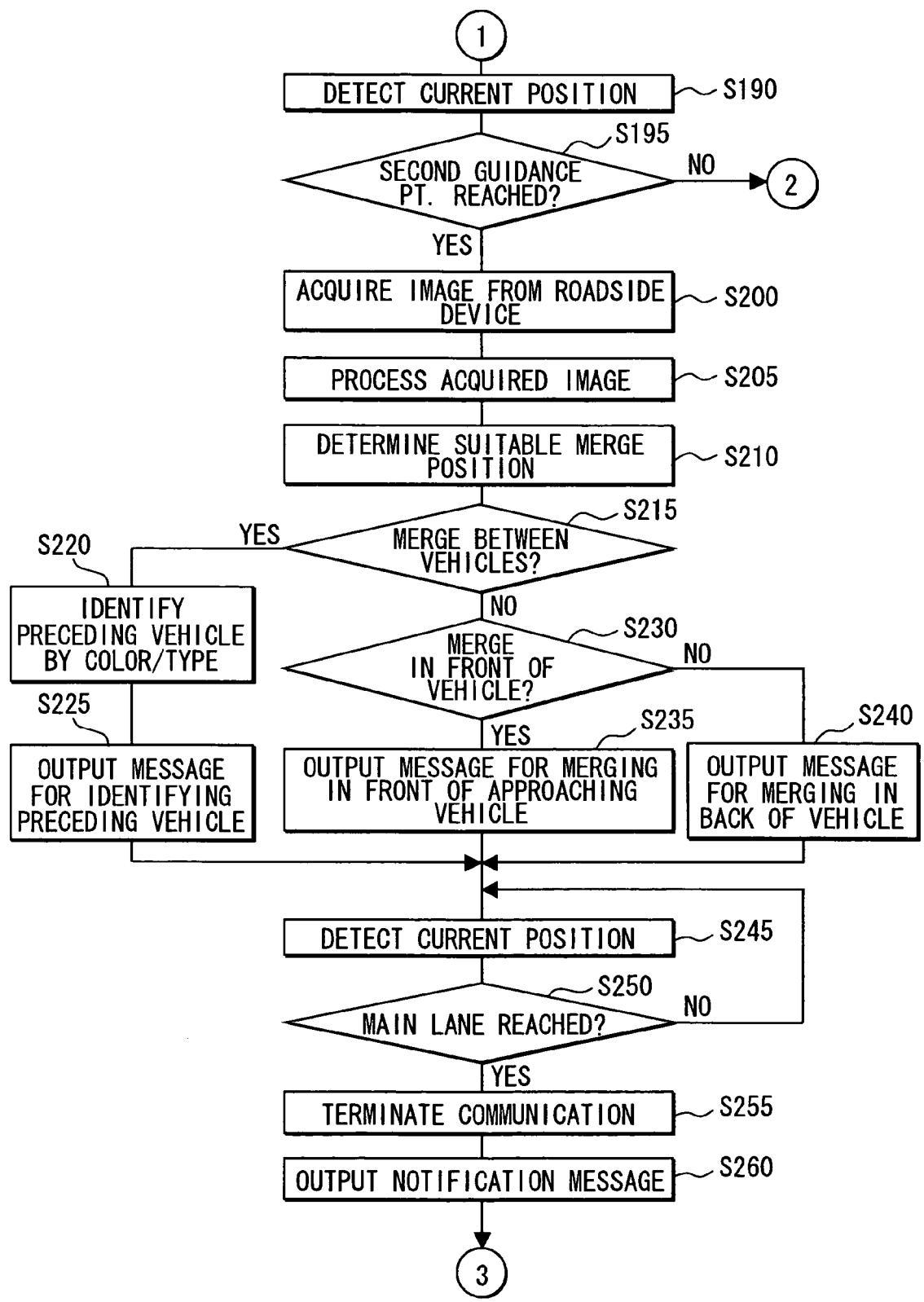

In step S190, as shown in FIG. 3, the process detects the current position of the subject vehicle again.

In step S195, the process determines whether the subject vehicle reaches the second guidance point (refer to FIG. 4) based on the current position of the subject vehicle and map data inputted from the map data input unit 25. The process proceeds to step S200 when the subject vehicle has reached the second guidance point (step S195: YES). The process returns to step S165 when the subject vehicle has not reached the second guidance point (step S195: NO).

In step S200, the process acquires an image of the main lane from the roadside device 40.

In step S205, the process conducts the recognition process that analyzes the image for determining whether the approaching vehicle is captured in the image. The recognition process is also used for determining the speed and the position of the approaching vehicle based on plural images taken at respectively different timings.

In step S210, the process calculates and determines a suitable merge position in the traffic. More practically, the process determines whether the subject vehicle merges with the traffic on the main lane in front of or in back of the approaching vehicle (or a group of approaching vehicles), or merges with the traffic in between two approaching vehicles (or two groups of approaching vehicles).

In step S215, the process determines whether the suitable merge position is between two approaching vehicles (or group of approaching vehicles). The process proceeds to step S220 when the suitable merge position is between the two vehicles (or two groups of vehicles) (step S215: YES). The process proceeds to step S230 when the suitable merge position is not between the two vehicles (or two groups of vehicles) (step S215: NO).

In step S220, the process detects an immediate preceding vehicle relative to the suitable merge position in the image acquired in step S200. That is, the immediate preceding vehicle is identified by a body color, a vehicle type (e.g., a sedan, a track, a bus or the like), a model name or the like.

In step S225, the process notifies the driver of the subject vehicle about the suitable merge position by using the identity of the immediate preceding vehicle. For example, the guidance voice from the voice output unit 27 may sound "Follow a white sedan in the traffic for merging with the traffic." or "Merge into the traffic by following a black track." or the like with an accompanying message displayed on the display unit 26.

In step S230, the process determines whether the suitable merge position in the traffic is in front of the approaching vehicle (or the group of the approaching vehicles) on the main lane. The process proceeds to step S235 when the suitable merge position in the traffic is in front of the approaching vehicle (or the group of the approaching vehicles) (step S230: YES). The process proceeds to step S245 when the suitable merge position in the traffic is not in front of the approaching vehicle (or the group of the approaching vehicles) (step S230: NO).

In step S235, the process outputs the guidance voice that encourages the driver to merge into the traffic in front of the approaching vehicle (or the group of the approaching vehicles). For example, the guidance voice from the voice output unit 27 may sound "Merge into the traffic in front of an approaching vehicle in a right rear direction." with an accompanying message displayed on the display unit 26.

In step S240, the process outputs the guidance voice that encourages the driver to merge into the traffic in back of the approaching vehicle (or the group of the approaching vehicles). For example, the guidance voice from the voice output unit 27 may sound "Merge into the traffic in back of a passing vehicle on the right." with an accompanying message displayed on the display unit 26.

In step S245, the process detects the current position of the subject vehicle again.

In step S250, the process determines whether the subject vehicle has reached the main lane. The process proceeds to step S255 when the subject vehicle is determined to have reached the main lane (step S250: YES). The process returns to step S245 when the subject vehicle is not determined to have reached the main lane (step S140: NO).

In step S255, the process terminates the communication with the roadside device 40.

In step S260, the process notifies the driver that the subject vehicle has merged into traffic on the main lane. For example, the guidance voice such as "Merge operation completed. Have a nice day!" or the like is provided for the driver from the voice output unit 27 together with a message displayed on the display unit 26. The process returns to step S105 after outputting the message.

The merge support process is described with reference to illustrations in FIGS. 6A to 10C. The illustrations in the figure are top views of the merge point. The messages in the illustrations are added for the illustrative purpose.

EXAMPLE 1

Figure 6A:
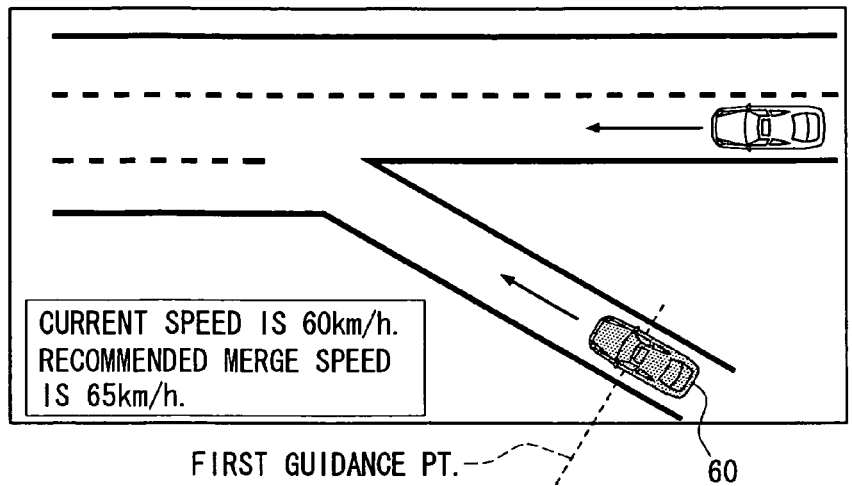
FIGS. 6A to 6C show illustrations of an operation of the merge support system as a first example.

[FIG. 6A: First Step]
The subject vehicle 60 equipped with the navigation system 20 reaches the first guidance point for merging into the traffic at the merge point. The navigation system 20 provides for the driver the guidance voice "Current speed is 60 km/h. Recommended merge speed is 65 km/h." (step S160)

Figure 6B:
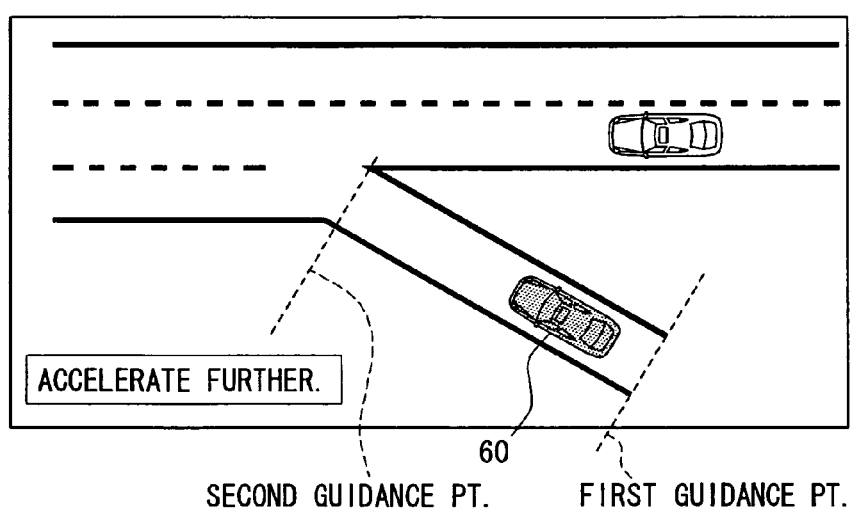

[FIG. 6B: Second Step]
The subject vehicle 60 proceeds toward the second guidance point after passing the first guidance point at a speed of less than 65 km/h. The navigation system 20 provides for the driver the guidance voice "Accelerate further." (step S180)

Figure 6C:
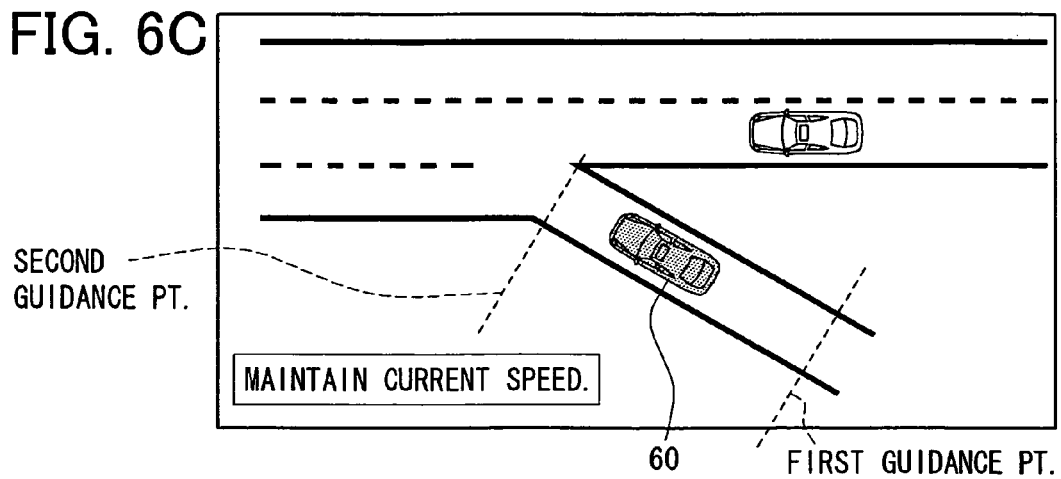

[FIG. 6C: Third Step]
The subject vehicle 60 accelerated to 65 km/h after proceeding further from the position in the second step. The navigation system 20 provides for the driver the guidance voice "Maintain current speed." (step S175)

Figure 7A:
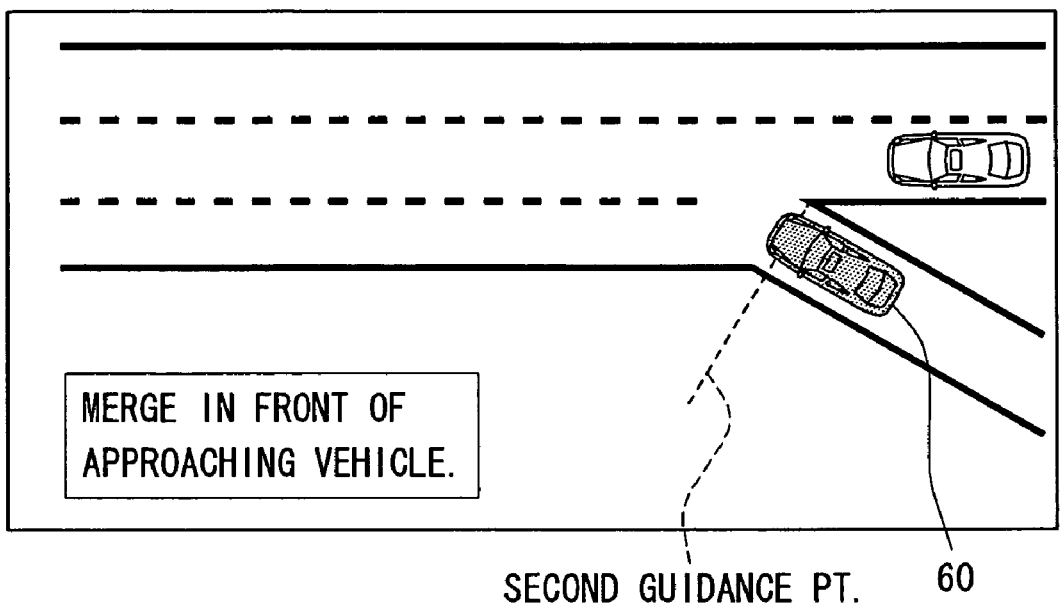
FIGS. 7A to 7B show illustrations of an operation of the merge support system as the first example.

[FIG. 7A: Fourth Step]
The subject vehicle 60 reaches the second guidance point at the speed of 65 km/h. The navigation system 20 provides for the driver the guidance voice "Merge in front of an approaching vehicle." (step S235)

Figure 7B:
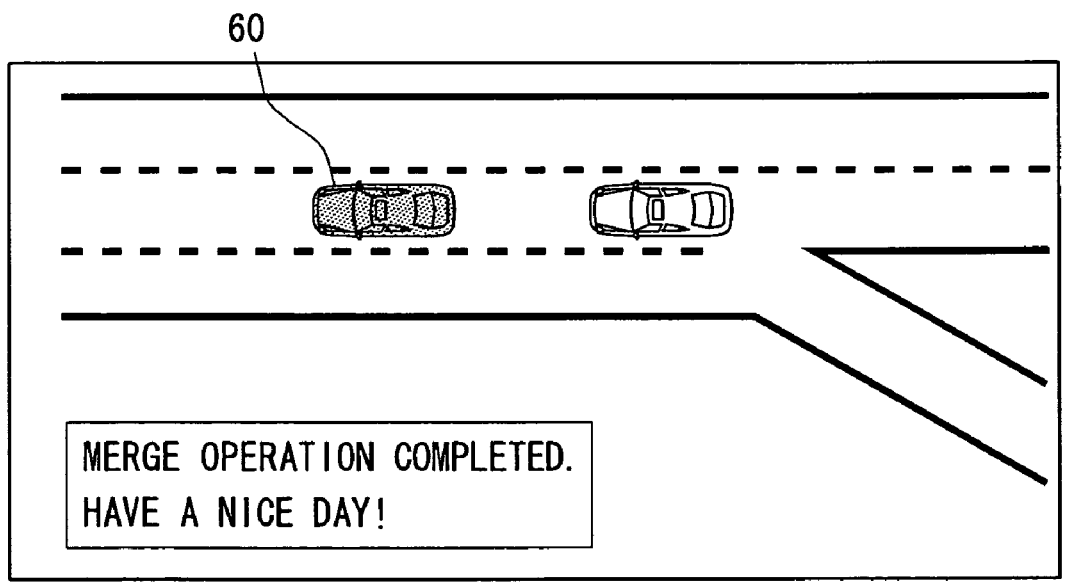

[FIG. 7B: Fifth Step]
The subject vehicle 60 has merged into the traffic on the main lane. The navigation system 20 provides for the driver the guidance voice "Merge operation completed. Have a nice day!" (step S260)

EXAMPLE 2

Figure 8A:
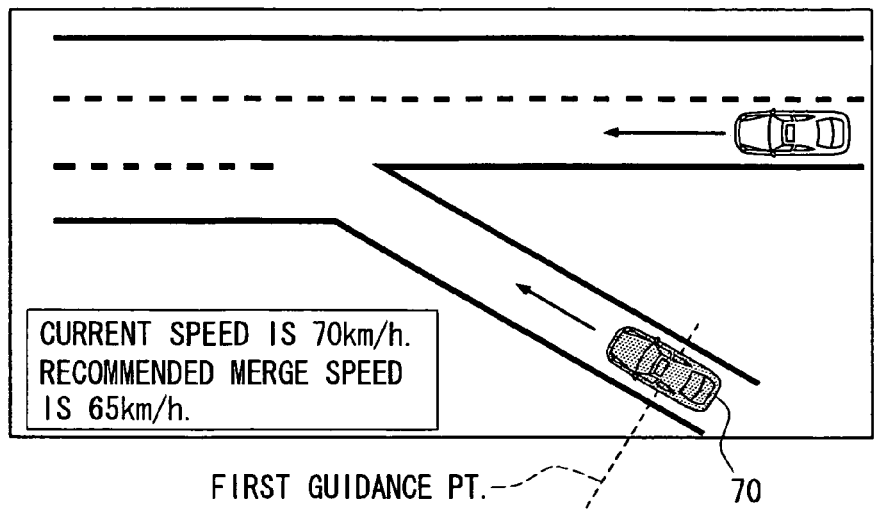
FIGS. 8A to 8C show illustrations of an operation of the merge support system as a second example.

[FIG. 8A: First Step]
The subject vehicle 70 equipped with the navigation system 20 reaches the first guidance point for merging into the traffic at the merge point. The navigation system 20 provides for the driver the guidance voice "Current speed is 70 km/h. Recommended merge speed is 65 km/h." (step S160)

Figure 8B:
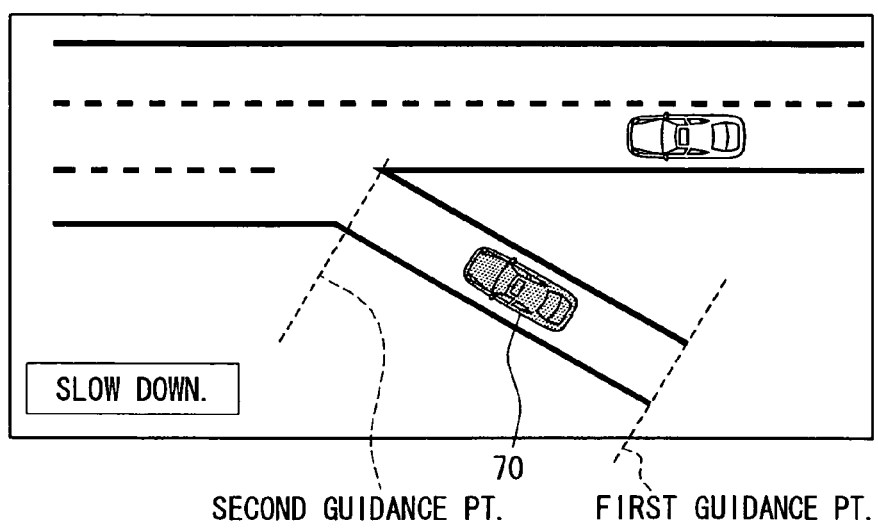

[FIG. 8B: Second Step]
The subject vehicle 70 proceeds toward the second guidance point after passing the first guidance point at a speed of greater than 65 km/h. The navigation system 20 provides for the driver the guidance voice "Slow down." (step S180)

Figure 8C:
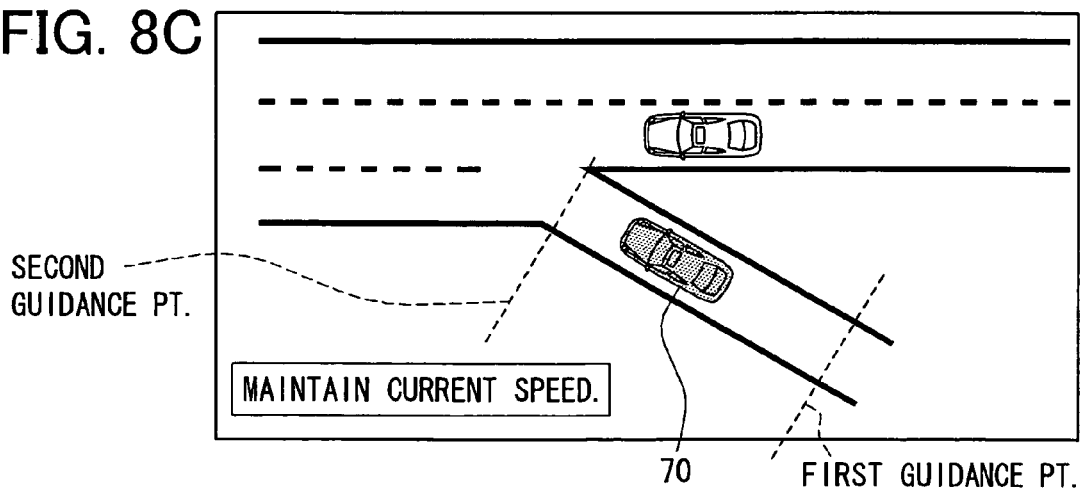

[FIG. 8C: Third Step]
The subject vehicle 70 decelerated to 65 km/h after proceeding further from the position in the second step. The navigation system 20 provides for the driver the guidance voice "Maintain current speed." (step S175)

Figure 9A:
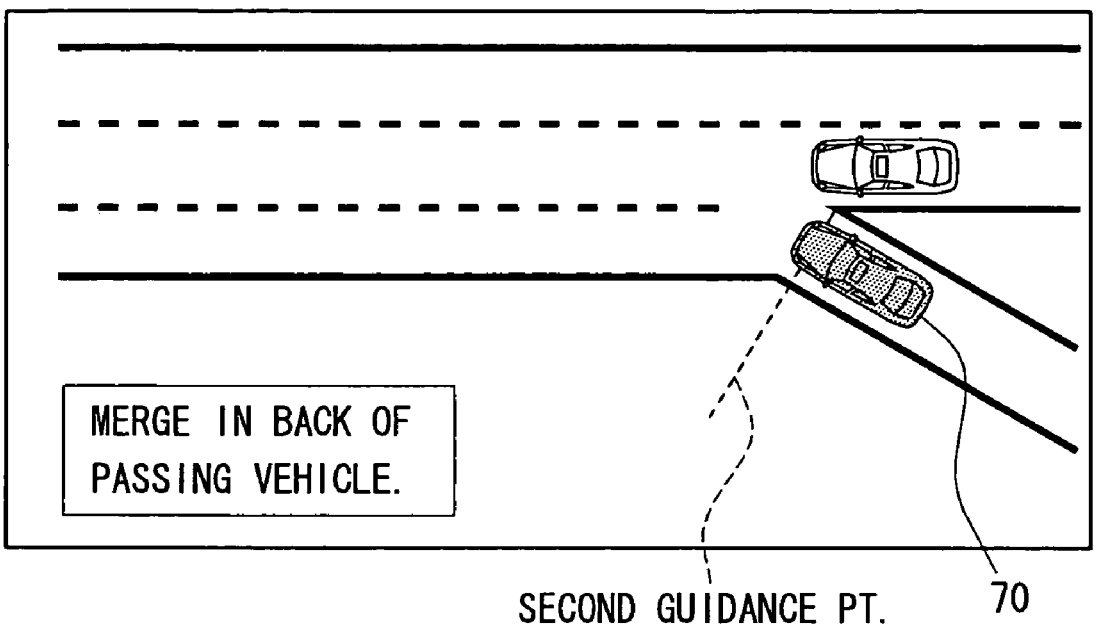
FIGS. 9A to 9B show illustrations of an operation of the merge support system as the second example.

[FIG. 9A: Fourth Step]

The subject vehicle 70 reaches the second guidance point after calculation of the suitable merge position (step S210). The navigation system 20 provides for the driver the guidance voice "Merge in back of a passing vehicle." (step S240)

Figure 9B:
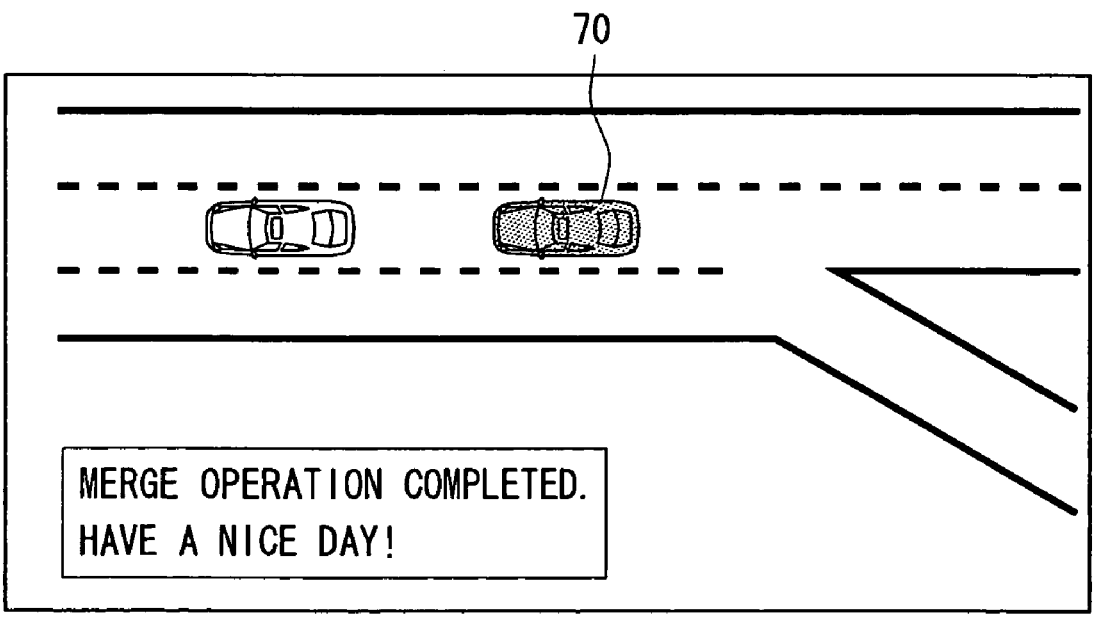

[FIG. 9B: Fifth Step]

The subject vehicle 70 has merged into the traffic on the main lane. The navigation system 20 provides for the driver the guidance voice "Merge operation completed. Have a nice day!" (step S260)

EXAMPLE 3

Figure 10A:
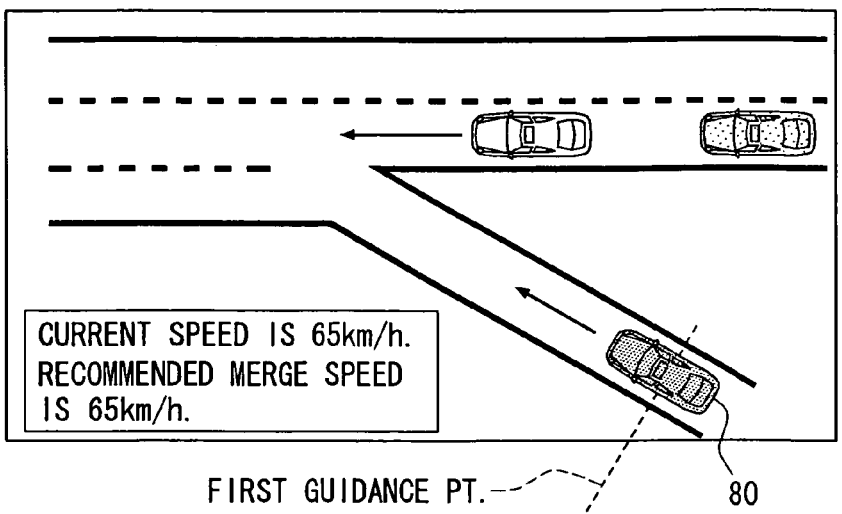
FIGS. 10A to 10C show illustrations of an operation of the merge support system as a third example.

[FIG. 10A: First Step]

The subject vehicle 80 equipped with the navigation system 20 reaches the first guidance point for merging into the traffic at the merge point. The navigation system 20 provides for the driver the guidance voice "Current speed is 65 km/h. Recommended merge speed is 65 km/h." (step S160)

Figure 10B:
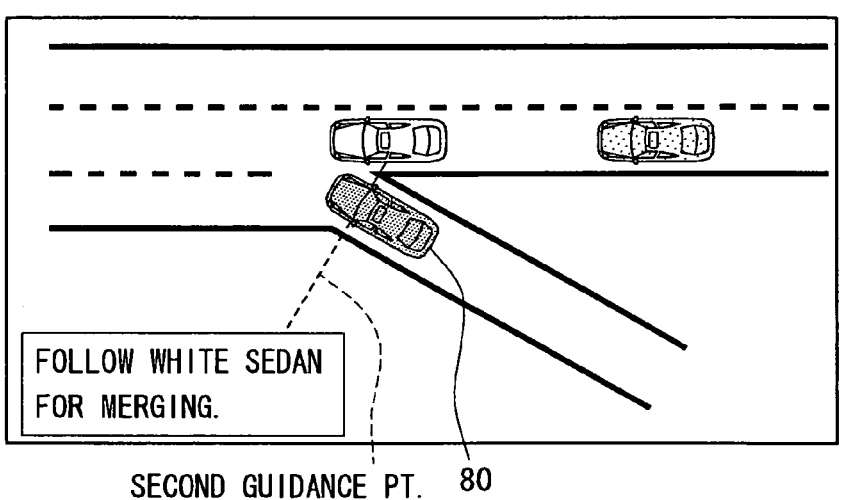

[FIG. 10B: Second Step]

The subject vehicle 80 reaches the second guidance point after calculation of the suitable merge position (step S210). The navigation system 20 provides for the driver the guidance voice "Follow a white sedan for merging into the traffic." (step S225)

Figure 10C:
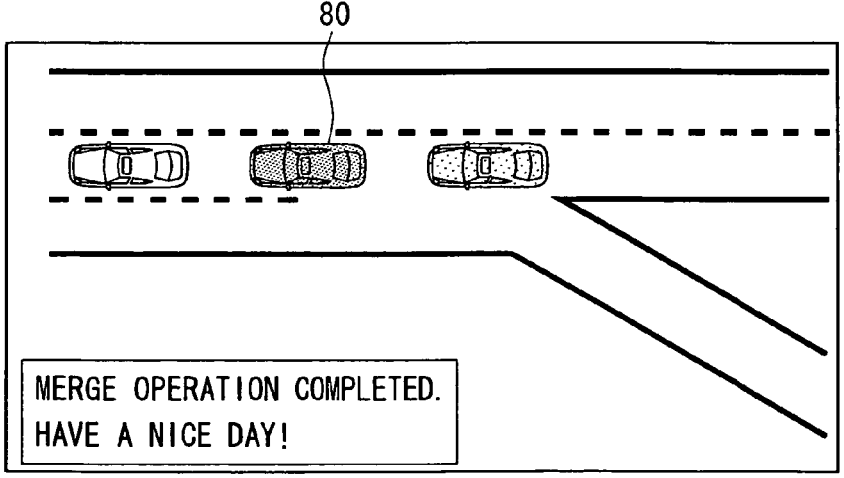

[FIG. 10C: Third Step]

The subject vehicle 80 has merged into the traffic on the main lane. The navigation system 20 provides for the driver the guidance voice "Merge operation completed. Have a nice day!" (step S260)

The advantage of the embodiment in the present disclosure is that the driver of the subject vehicle equipped with the navigation system 20 is freed from calculation and prediction of the recommended merge speed when the vehicle merges the traffic on the main lane. That is, the navigation system 20 bears a load of the calculation and prediction of the recommended merge speed for decreasing the load on the driver's side.

Further, the suitable merge position is detected by the navigation system 20 and is notified to the driver. That is, the suitable merge position is identified relative to the approaching vehicle on the main lane and is notified to the driver. Therefore, the navigation system 20 further decreases the load on the driver's side in terms of determining the suitable merge position.

The approaching vehicle on the main lane is identified by the body color, the vehicle type or the like in a message of the guidance voice. For example, the massage may sound "Follow a white sedan for merging into the traffic." Therefore, the driver of the subject vehicle can recognize the approaching vehicle easily in an unmistakable manner. In addition, the vocally provided message allows the driver to concentrate on driving operation without watching the massage on the display unit 26, thereby serving the driver an improved state of safety.

Although the present disclosure has been fully described in connection with the preferred embodiments thereof with reference to the accompanying drawings, it is to be noted that various changes and modifications will become apparent to those skilled in the art.

For example, the image of the main lane captured by the roadside device 40 may be processed on the roadside device 40 for detecting the speed and the position of the approaching vehicle(s). That is, only the detected speed and the position of the approaching vehicle may be transmitted from the roadside device 40 to the subject vehicle. In this manner, the process load on the navigation system 20 is decreased.

Further, the navigation system 20 may communicate with the approaching vehicle equipped with the communication unit 24 for acquiring the speed and the position directly from the approaching vehicle. In this manner, the process load on the navigation system 20 is decreased.

Furthermore, the present embodiment described the merge support system as a part of the navigation system 20. However, the merge support system may be separately constructed from the navigation system 20. In that case, the merge support system may acquire the current position and related information from the position detector, the navigation system of general use or the like.

Figure 11:
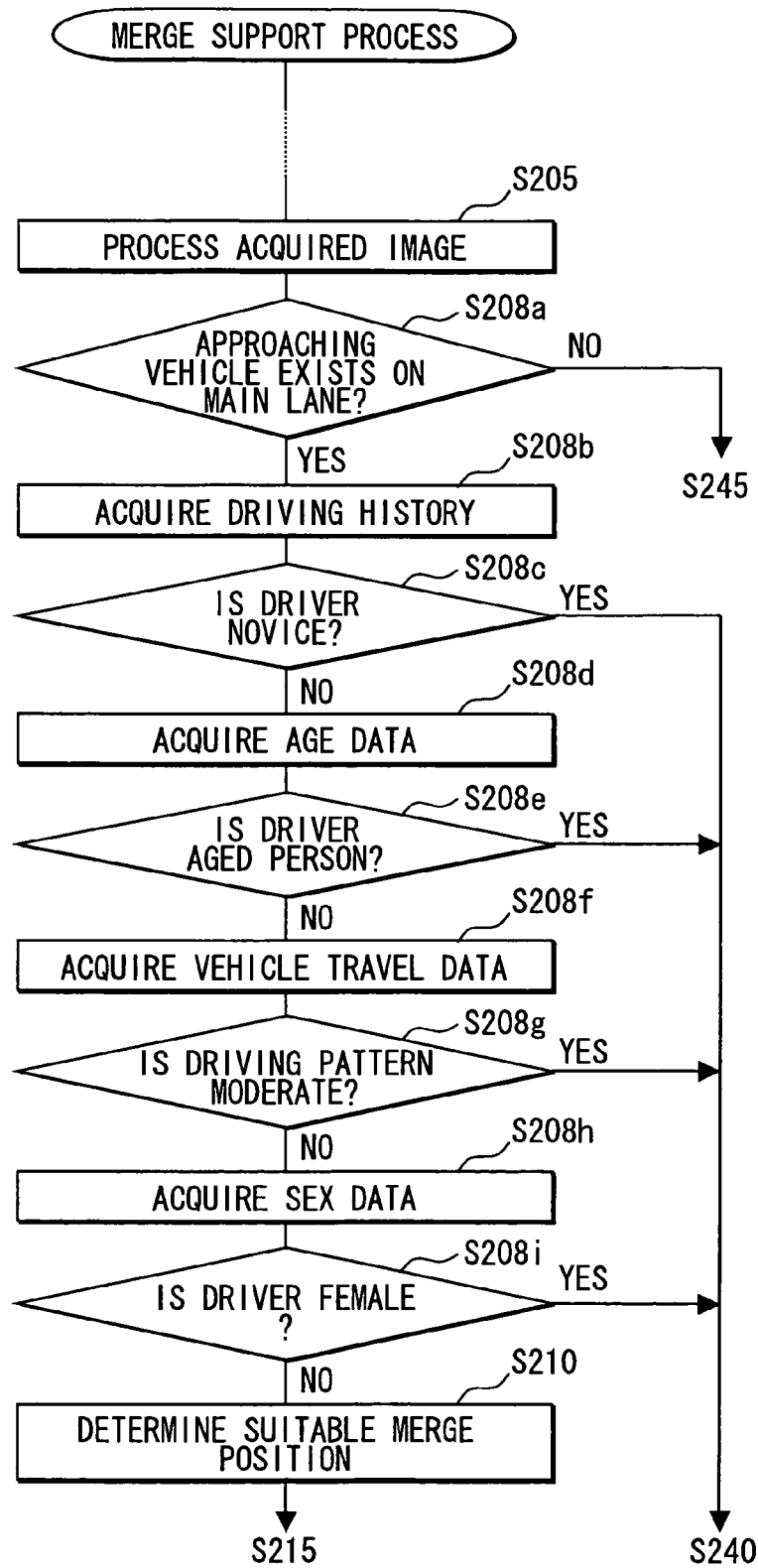
FIG. 11 shows another flowchart of the merge support process conducted in the navigation system in the present embodiment.

Furthermore, the suitable merge position may be calculated by taking account of a driver's characteristic analysis in addition to the speed/position of the approaching vehicle and the subject vehicle as described in step S210 in the above embodiment. FIG. 11 shows a flowchart of the merge support process that takes account of the driver's characteristic analysis. Steps S208a to S208i are added between steps S205 and S210.

In step S208a, the process in the control unit 29 determines whether an approaching vehicle exists on the main lane for branching the process after step S205. More practically, the process proceeds to step S208b when the approaching vehicle exists in a range of 100 meters in back of the subject vehicle (step S208a: YES). The process proceeds to step S245 (FIG. 3) when the approaching vehicle does not exist in a range of 100 meters in back of the subject vehicle (step S208a: YES)

In step S208b, the process retrieves a driving history of a currently driving driver from the driver information storage unit 35. The currently driving driver may be identified at a start of travel by having an ID code input or the like from the driver.

In step S208c, the process determines whether the driver is a novice. More practically, the driver may be determined as the novice based on, for example, travel distance, the number of times for passing through the merge point of interest, or the like. That is, when the total travel distance is shorter than 10,000 km, or when the number of times for passing through the merge point is less than 10 times, the driver is determined as the novice. The process proceeds to step S240 (FIG. 3) when the driver is determined as the novice (step S208c: YES). The process proceeds to step S208d when the driver is not determined as the novice (step S208c: NO).

In step S208d, the process acquires age data of the driver from the driver information storage unit 35.

In step S208e, the process determines whether the driver is an aged person based on the age data acquired in step S208d. More practically, the driver is determined as the aged person when, for example, he/she is equal to or over an age of 60. The process proceeds to step S240 (FIG. 3) when the driver is determined as the aged person (step S208e: YES). The process proceeds to step S208f when the driver is not determined as the aged person (step S208e: NO).

In step S208f, the process acquires vehicle travel data (i.e., an average of vehicle speed transition at vehicle start time) from the driver information storage unit 35. The vehicle travel data may be substituted with driving operation data (i.e., an average of accelerator opening degree or the like).

In step S208g, the process determines whether a driving pattern of the driver corresponds to one of three typical preset patterns based on the vehicle travel data (or the driving operation data). The three preset patterns are "Fast-paced," "Normal," and "Moderate."

Figure 12:
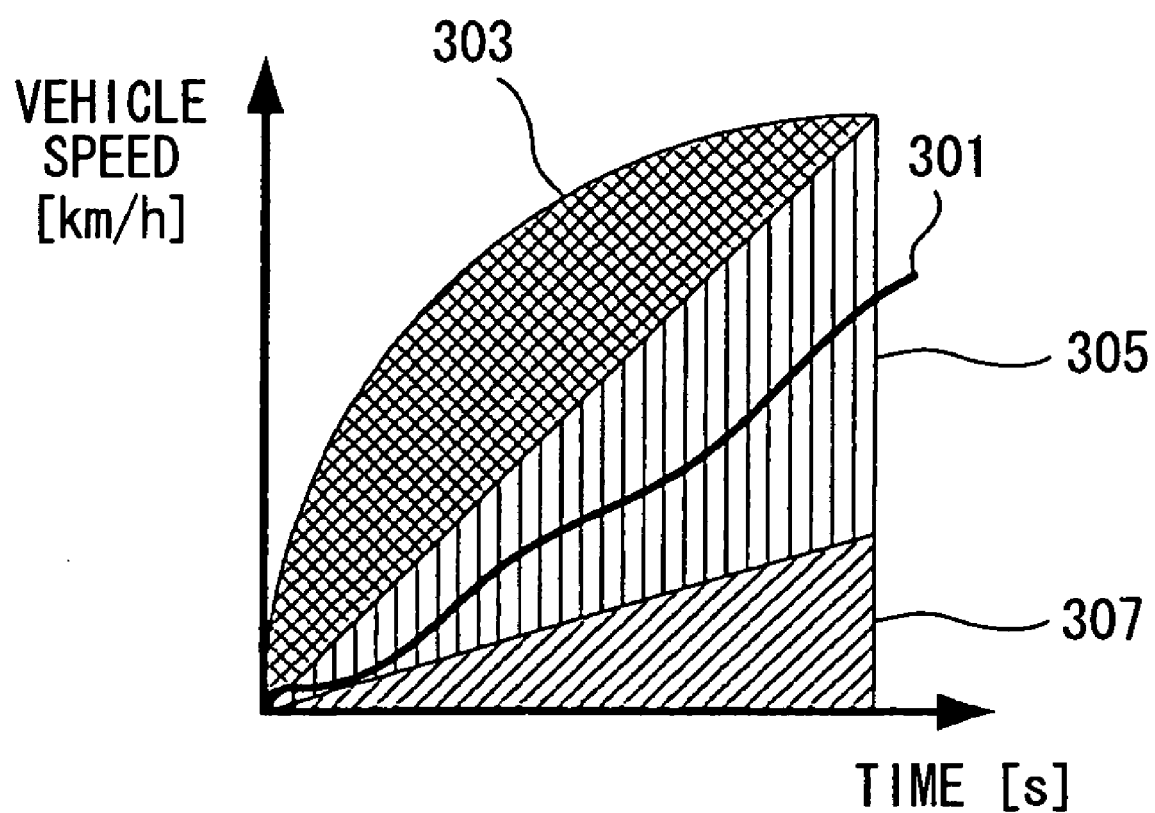
FIG. 12 shows a diagram of relationship between an average start speed and categories of driving types.

Determination method of the three preset patters is described with reference to a diagram in FIG. 12. The diagram in FIG. 12 has a horizontal axis of time (s) against a vertical axis of vehicle speed (km). A solid line 301 represents the average of vehicle speed transition of 10 recent vehicle start times. Three areas 303, 305, 307 defined in the diagram respectively represent the driving pattern of "Fast-paced," "Normal," and "Moderate." In the diagram in FIG. 12, the solid line 301 mainly exists in the area 305. Thus, the driving pattern of the driver is determined as "Normal" in this case. In this manner, the driving pattern of the driver is determined by plotting the vehicle travel data acquired in step S208f. When the driving operation data is used, the vehicle speed is estimated based on the driving operation data.

After determining the driving pattern, the process proceeds to step S240 (FIG. 3) when the driving pattern is determined as "Moderate" (step S208g: YES). The process proceeds to step S208h when the driving pattern is not determined as "Moderate" (step S208g: NO).

In step S208h, the process acquires sex data of the driver from the driver information storage unit 35.

In step S208i, the process determines whether the driver is a female based on the sex data acquired in step S208h. The process proceeds to step S240 (FIG. 3) when the driver is determined as the female (step S208i: YES). The process proceeds to step S210 (FIG. 3) when the driver is not determined as the female (step S208i: NO).

The suitable merge position determined by above described scheme suitably serves for the driver because of the following reasons. That is, when the driver is determined as either of the novice (step S208c: YES), the aged person (step S208e: YES), the moderate driver (step S208g: YES), or the female (step S208i: YES), the process proceeds to step S240. That is, the process always encourages the driver to follow the approaching vehicle on the main lane for merging. In this manner, the navigation system 20 provides for the driver a guidance of affordable driving operation. On the other hand, the navigation system 20 provides for the driver a guidance of normal driving operation for merging between the approaching vehicles or in front of the approaching vehicle when the driver is determined as not the novice, not aged, not "Moderate," and not the female (i.e., a male). That is, the guidance for the driver is more commanding or controlling based on the situation.

Furthermore, the data in the driver information storage unit 35 may be copied to a portable information storage medium for being carried by the driver. The portable information storage medium may be, for example, various types of memory card, an internal memory of a cellular phone or the like. The data may be copied to the driver information storage unit 35 of the vehicle before starting the travel. In this manner, the navigation system 20 can suitable provide for the driver an appropriate merge support guidance even when the vehicle is driven by the driver for the first time.

Such changes and modifications are to be understood as being within the scope of the present invention as defined by the appended claims.

What is claimed is:

1. A vehicular navigation system for merge navigation comprising:
    a first detection unit for detecting a position and a speed of an approaching vehicle in a traffic on a main lane by using a roadside device;
    a second detection unit for detecting a position and a speed of a subject vehicle;
    an information provision unit for vocally providing information for a driver of the subject vehicle;
    a control unit for calculating a merge speed control of the subject vehicle relative to the traffic on the main lane and a merge position relative to the traffic on the main lane,
    wherein the control unit calculates the merge speed control to be provided for the driver of the subject vehicle from the information provision unit based on the position and the speed of the approaching vehicle and the subject vehicle detected by the first and second detection units, and wherein the control unit calculates the merge position to be provided for the driver of the subject vehicle from the information provision unit based on the position and the speed of the approaching vehicle and the subject vehicle detected by the first and second detection units in succession to calculation of the merge speed control; and
    a driver information storage unit for storing personal information on respective drivers in association with at least an age, a sex, personality, and a driving skill of the respective drivers,
    wherein the control unit calculates the merge position for a currently driving driver who is currently driving the subject vehicle based on the information of the currently driving driver in the driver information storage unit,
    the control unit provides the merge position for the driver of the subject vehicle by the information provision unit in association with attribute information of the approaching vehicle in the traffic on the main lane in terms of at least one of a vehicle type, a body color, and a vehicle model name acquired from the roadside device disposed outside of the subject vehicle, and
    the merge position provided for the driver of the subject vehicle includes a position of the subject vehicle relative to the approaching vehicle at a time of merging into the traffic on the main lane.

2. The vehicular navigation system as in claim 1,
    wherein the driving skill of the driver in the driving skill storage unit is one of a driving operation information history of the driver and a vehicle travel information history.

3. A merge support system having
    the vehicular navigation system of claim 1, wherein
    the roadside device disposed at a merge point of the main lane and a ramp,
    wherein the roadside device comprises:
        a vehicle detector for detecting a position and a speed of an approaching vehicle on the main lane; and
        a communication unit for transmitting the position and the speed of the approaching vehicle to the navigation system.

4. A vehicular navigation system for merge navigation comprising:
    a first detection unit for detecting a position and a speed of an approaching vehicle in a traffic on a main lane by using a roadside device;
    a second detection unit for detecting a position and a speed of a subject vehicle;
    a information provision unit for vocally providing information for a driver of the subject vehicle;
    a control unit for calculating a merge speed of the subject vehicle relative to the traffic on the main lane and a merge position relative to the traffic on the main lane,
    wherein the control unit calculates the merge speed to be provided for the driver of the subject vehicle from the information provision unit based on the position and the speed of the approaching vehicle and the subject vehicle detected by the first and second detection units, and wherein the control unit calculates the merge position to be provided for the driver of the subject vehicle from the information provision unit based on the position and the speed of the approaching vehicle and the subject vehicle detected by the first and second detection units in succession to calculation of the merge speed; and a driver information storage unit for storing information on respective drivers in association with at least an age, a sex, personality, and a driving skill of the respective drivers, wherein the control unit calculates the merge position for the driver who is currently driving the subject vehicle based on the information of the currently driving driver in the driver information storage unit, the control unit provides the merge position for the driver of the subject vehicle by the information provision unit in association with attribute information of the approaching vehicle in the traffic on the main lane in terms of at least one of a vehicle type, a body color, and a vehicle model name, and the merge position provided for the driver of the subject vehicle includes a position of the subject vehicle relative to the approaching vehicle at a time of merging into the traffic on the main lane.

5. A vehicular navigation system for merge navigation comprising:

a first detection unit for detecting a position and a speed of an approaching vehicle in a traffic on a main lane by using a roadside device;

a second detection unit for detecting a position and a speed of a subject vehicle;

an information provision unit for vocally providing information for a driver of the subject vehicle;

a control unit for calculating a merge speed yielding operation of the subject vehicle relative to the traffic on the main lane and a merge position relative to the traffic on the main lane, wherein the control unit calculates the merge speed yielding operation to be provided for the currently driving driver of the subject vehicle from the information provision unit based on the position and the speed of the approaching vehicle and the subject vehicle detected by the first and second detection units, and wherein the control unit calculates the merge position to be provided for the currently driving driver of the subject vehicle from the information provision unit based on the position and the speed of the approaching vehicle and the subject vehicle detected by the first and second detection units in succession to calculation of the merge speed yielding operation; and a driver information storage unit for storing personal information on respective drivers in association with at least an age, a sex, personality, and a driving skill of the respective drivers, wherein the control unit calculates the merge position for the currently driving driver who is currently driving the subject vehicle based on the information of the currently driving driver in the driver information storage unit, the control unit provides the merge position for the currently driving driver of the subject vehicle by the information provision unit in association with attribute information of the approaching vehicle in the traffic on the main lane in terms of at least one of a vehicle type, a body color, and a vehicle model name acquired from the roadside device disposed outside of the subject vehicle, and the merge position of the subject vehicle provided for the currently driving driver of the subject vehicle includes one of a front position and a back position relative to the approaching vehicle at a time of merging into the traffic on the main lane.

* * * * *